United States Patent
Kibler

[11] 3,819,250
[45] June 25, 1974

[54] TEMPERATURE SENSITIVE FIBER-OPTIC DEVICES

[75] Inventor: Lynden Underwood Kibler, Middletown, N.J.

[73] Assignee: Bell Telephone Laboratories, Incorporated, Murray Hill, N.J.

[22] Filed: Dec. 20, 1972

[21] Appl. No.: 316,655

[52] U.S. Cl. .......................... 350/96 R, 350/96 WG
[51] Int. Cl. ................................................ G02b 5/14
[58] Field of Search........... 350/96 R, 96 B, 96 WG, 350/311, 160 R

[56] References Cited
UNITED STATES PATENTS

| | | | |
|---|---|---|---|
| 3,208,342 | 9/1965 | Nethercot | 350/160 R |
| 3,244,075 | 4/1966 | Richards et al. | 350/96 B |
| 3,308,394 | 3/1967 | Snitzer et al. | 350/96 WG X |
| 3,311,845 | 3/1967 | Koester | 350/96 WG X |
| 3,586,417 | 6/1971 | Fields | 350/160 R |

Primary Examiner—David H. Rubin
Attorney, Agent, or Firm—John P. McDonnell; Wilford L. Wisner

[57] ABSTRACT

An optical fiber with a quartz cladding and a liquid core is used to create an aperture coupler and a low loss small radius bend light guide by controlling the temperature of the fiber. Also, a directional coupler is formed by placing two light carrying quartz rods in a dielectric liquid and controlling the temperature of the liquid and rods.

5 Claims, 3 Drawing Figures

TEMPERATURE SENSITIVE FIBER-OPTIC DEVICES

BACKGROUND OF THE INVENTION

This invention relates to devices for fiber-optic communications systems and, more particularly, to temperature controlled fiber-optic devices employing quartz and dielectric liquids.

In fiber-optic communications systems many of the devices used in electrical systems, such as modulators and amplifiers, are also required. However, the fiber-optic systems have certain problems which are unique. Typical of these is the problem of efficiently coupling light into a fiber from an external source. Also, since fiber-optic transmission is most efficient when the indices of refraction of the core and cladding are close to one another, there is a light loss problem, which is not found in electrical systems, when the fiber undergoes a small radius bend.

Another problem involves the coupling of light between fibers. One type of apparatus for coupling light from one fiber to another fiber has two unclad fibers placed close to each other in an electro-optic substrate. Then light is coupled from one of the fibers to the other by the application of an electric field to the substrate. This field changes the index of refraction of the substrate and allows the light to leak from one fiber to the other. With respect to the problem of light loss in small radius bends, some fiber-optic systems use a different fiber, with a large difference in the indices of refraction of the core and cladding, in the bend. One form of this is disclosed in British Pat. No. 1,140,908 of M. P. Barton, which was published Jan. 22, 1969. This system uses a confined cool gas flow, which is heated to produce a radial change in the index of refraction, as the light conductor in small radius bends. This technique, of course, suffers from the problems incurred in having to splice in a different section of fiber or other light conductor at each small radius bend. A much more practical system would use the same fiber throughout and would form the devices needed to solve the unique problems of a fiber-optic system, from the same material as the fiber.

Therefore, it is the object of this invention to provide a single fiber, optical communications systems capable of small radius bends, variable direction coupling and wide aperture coupling.

SUMMARY OF THE INVENTION

The present invention is directed to reducing the complexity of a fiber-optic system by allowing for the creation of wide aperture couplers, directional couplers and small radius bend light guides with a single type of fiber.

In an illustrative embodiment of the invention, the fiber-optic system uses a fiber having a liquid core, such as carbon tetrachloride ($CCl_4$) or tetrachloroethylene ($C_2Cl_4$) and a quartz cladding. Then the various devices needed for the system are formed by adjusting the temperature of the fiber. These devices are formed because of the negative temperature sensitivity of the difference in the indices of refraction of the core and cladding of such a fiber.

In particular, the wide aperture coupler, which is a device for coupling light into or out of the end of a fiber, is formed by heating the end of the fiber closest to the light source or receiver. This will make the indices of refraction of the core and cladding nearly the same. Since the temperature will gradually reduce along the length of the fiber with increasing distance from the heat source, there will be a corresponding decrease in the critical angle for the core in the same direction. This will allow light trapped in the cladding near the heated end of the fiber to eventually enter and be confined to the core, or light in the core to spread into the cladding as it approaches the heated end. Therefore, more light from a source can be coupled into the core or light in the core can illuminate a larger area.

The small radius bend light guide is formed by cooling the fiber at the bend. The reduced temperature will increase the difference in the indices of refraction of the core and cladding, thereby providing increased light wave guidance through the bend.

The directional coupler uses a modification of the basic fiber structure, in that the light in the coupler is carried by two quartz rods embedded in a dielectric liquid such as carbon tetrachloride ($CCl_4$). When this structure is heated or cooled different amounts of light will be coupled from one rod to the other because of the relative change in the indices of refraction of the liquid and the quartz.

The foregoing and other features of the present invention will be more readily apparent from the following detailed description and drawings.

DETAILED DESCRIPTION

Figure 1:
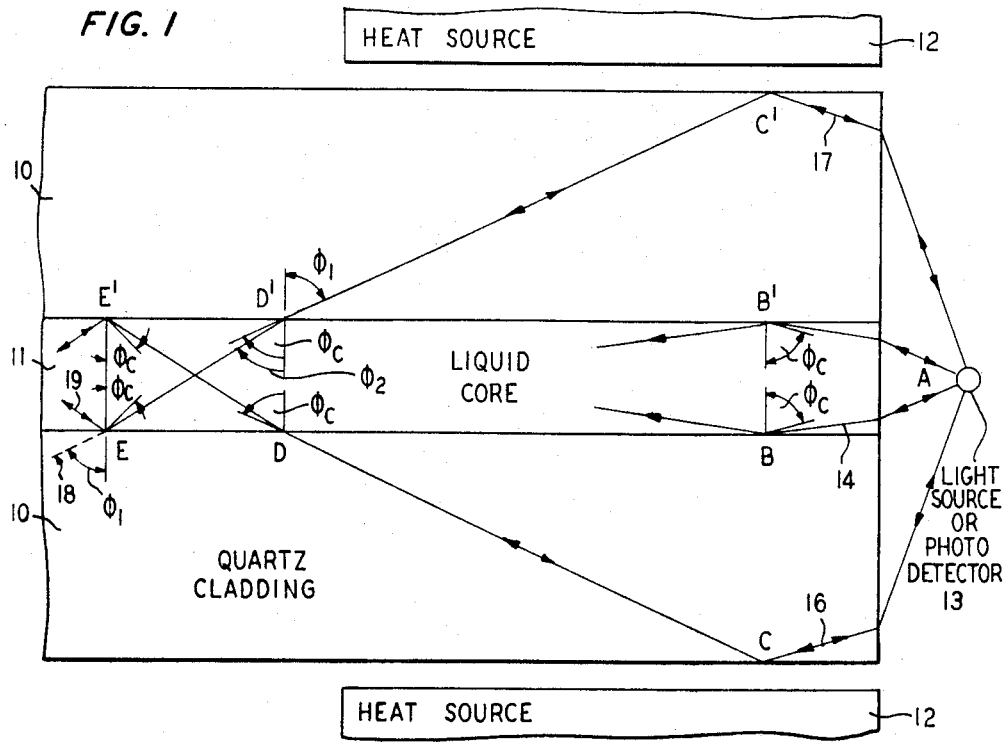
FIG. 1 is an illustrative embodiment of the invention used as a wide aperture coupler.

FIG. 1 shows an enlarged view of one end of an optical fiber. The fiber has a quartz cladding 10 and a liquid core 11 with an index of refraction $n_2$, which is slightly larger than the index of refraction $n_1$ of the cladding. The cladding and the core materials are chosen so that the variation in their indices of refraction with temperature are not the same. For example, when the liquid core is carbon tetrachloride, the difference in the indices of refraction between the liquid and the quartz will be $-6.32 \times 10^{-3}/C°$. This is computed by taking the difference between the index of refraction for quartz, which is given by the expression $$n_q = 1.457163 + 0.98635 (T - 20) \times 10^{-5}, \tag{1}$$

and the index of refraction for carbon tetrachloride, which is determined by the expression $$n_L = 1.4709 - 6.22 \times 10^{-4}T + \Delta u \tag{2}$$

where T equals the temperature in degrees Centigrade and $\Delta u$ is the tabulated correction factor. At 20° C, the difference in indices of refraction between the core and the cladding is 0.0013. This is ideal for low loss fundamental mode propagation in the fiber. The reasons for this efficient propagation when there is a small difference between the two indices are detailed in an article entitled "Research on Optical Fiber Transmission" by T. Li and E. A. J. Marcatili, which appeared on pages 331 through 337 of the December, 1971 issue of the *Bell Labs Record*. The liquid core could be other dielectric liquids such as tetrachloroethylene ($C_2Cl_4$).

A heat source 12 is placed around the end of the fiber. With this arrangement, light from source 13, which is located at point A in FIG. 1, can be coupled into the fiber. The effect of the heat source is to change the critical angle, $\phi_c$, between the core and the fiber. Light from source 13, represented by rays 14 and 15, is trapped within the core of the fiber and propagates along its length. However, without the heat source the light represented by rays 16 and 17 would ordinarily propagate in the cladding and would not be coupled into the core. This happens because, at the interface between the cladding and the surrounding environment, the critical angle is small. The critical angle is defined as $$\sin \phi_c = n/n' \quad (3)$$

where $n'$ is the index of refraction of the material in which the light is traveling and $n$ is the index of the material on the other side of the interface. The critical angle is measured from the normal to the interface between the two different materials. Any light ray which strikes the interface at more than the critical angle will be internally refracted. Therefore, the smaller the critical angle, the greater the chance for internal refraction. Since there is a large difference between the index for air and quartz the critical angle at points such as C and C' in FIG. 1 is small, and the light rays 16 and 17 are internally refracted. When these refracted rays pass from the cladding into the core at points D and D' in FIG. 1 (for an unheated fiber) they are bent toward the normal according to the relationship $$n_1 \sin \phi_1 = n_2 \sin \phi_2 \quad (4)$$

where $\phi_1$ is the angle at which the ray travels across the cladding and $\phi_2$ is the angle at which it travels across the core, as shown in FIG. 1. On reaching the other side of the core at points E and E' the rays pass into the cladding as indicated by dotted ray 18. This ray has the same angle with respect to the normal, $\phi_1$, as it did when it approached the core at points D and D'. This process will continue in the unheated fiber with the rays, that originally impinged on the cladding, continually passing through the core; but, never being trapped there.

When one end of the fiber is heated so that the two indices of refraction are brought close together, the light rays, 16 and 17, will not be significantly bent toward the normal at points D and D', as Equation (4) shows. This heating, also, has the effect of increasing the critical angle in the heated region, as shown at points B and B' in FIG. 1, over that in the unheated region, as shown at points E and E'. Under these conditions the rays 14 and 15 incident on the core will still be confined to the core; but now the rays 16 and 17 can be confined to the core also. This happens because there is a change in the difference in indices of refraction, and consequently the critical angle, between points E and D in the fiber, due to a temperature gradient between those points. Since the heat source 12 does not extend beyond points D and D', this gradient is a decreasing temperature. Therefore, at points D and D' the rays 16 and 17 undergo very little change in direction as they enter the core because their indices are close together. However, at the points E and E', where the rays reach the other side of the core, the indices have a larger difference resulting in a critical angle which traps the ray, as shown by ray 19 in FIG. 1. If points D and D' had not been at the elevated temperature, the rays 16 and 17 would have undergone a bend toward the normal which would cause them to approach the points E and E' at an angle exceeding the critical angle, thereby preventing them from being trapped in the core. From this analysis it is seen that heating one end of the optical fiber has allowed for the coupling of more light into the core of the fiber from source 13 than would ordinarily be possible. In effect, the temperature gradient between points D and E acts as a lens. This indicates that the process is reversible and that light propagating in the core will expand into the cladding at the heated end of the fiber, allowing illumination of a larger area of a photo detector, which is used to replace light source 13.

Figure 2:
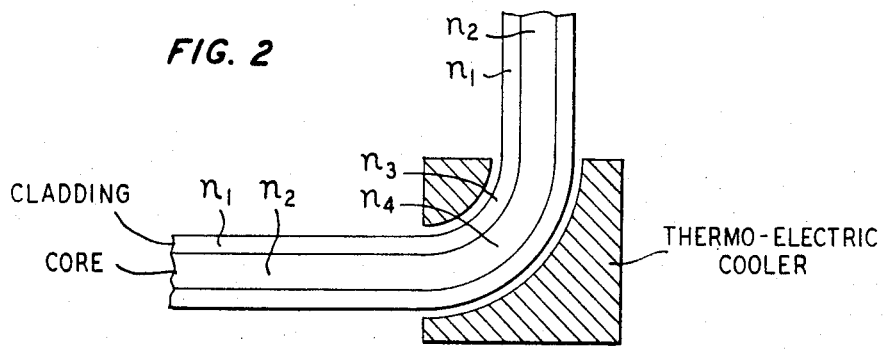
FIG. 2 is an illustrative embodiment of the invention used as a small radius bend light guide.

FIG. 2 is a schematic representation of a small radius bend light guide in the optical fiber. Surrounding the fiber in the region of the bend is a thermo-electric cooler 20. As was mentioned previously, the indices of refraction of the core and cladding ($n_2$ and $n_1$, respectively), are close together for efficient transmission. This would normally result in a large light loss in a small radius bend like that indicated in FIG. 2. To prevent this light loss, the thermo-electric cooler causes an increase in the difference between the index of the core and the cladding to $n_4$ and $n_3$, respectively. This allows the light to be guided through the bend without a substantial loss. Once the bend is completed the fiber returns to its normal temperature range and the conditions for low loss propagation are re-established.

Figure 3:
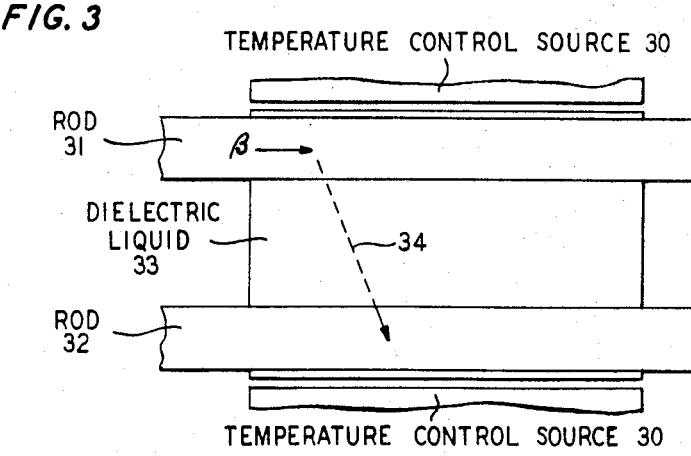
FIG. 3 is an illustrative embodiment of the invention used as a directional coupler.

The principles of this invention and the same materials used for creating the optical fiber can also be used to create a directional coupler. Such an arrangement would have two light conducting rods made of quartz embedded in a dielectric material, such as carbon tetrachloride. FIG. 3 shows this arrangement with quartz rods 31 and 32 embedded in a dielectric liquid 33. Surrounding the dielectric liquid is a source 30 for heating or cooling the dielectric liquid. If light is propagating in rod 31, as indicated by the arrow $\beta$, a change in the temperature of the rod and the dielectric liquid would allow light to leak from rod 31 through the dielectric liquid to rod 32. This is indicated by arrow 34 in FIG. 3. With this arrangement the amount of light coupled from one rod to the other is controlled by the temperature control source 30.

While the invention has been particularly shown and described with reference to specific embodiments thereof, it will be understood by those skilled in the art that various changes in form and detail may be made therein without departing from the spirit and scope of the invention.

I claim:

1. A wide aperture optical coupler for coupling light beams into and out of an end of a fiber-optic guide, said coupler comprising:

a first transparent material having an index of refraction $n_1$ and being dielectric, said first transparent material forming the core of said fiber-optic guide;

a second transparent material in contact with said first material and having an index of refraction $n_2$, said second transparent material forming the cladding of said fiber-optic guide, the indices $n_1$ and $n_2$ being substantially the same in value at a particular temperature and having different temperature sensitivities; and temperature control means disposed about the end of said fiber-optic guide where the coupling is to take place for generating a variation in the difference in the indices of refraction of said first and second transparent materials in the vicinity of said end by controlling the temperature of said end, the difference in the indices being substantially zero at said end and gradually increasing in a limited region of said guide away from said end, whereby coupling of light beams into and out of said end of said fiber-optic guide is facilitated.

2. A coupler as claimed in claim 1 wherein said first material is a dielectric liquid and said second material is a crystalline solid.

3. A coupler as claimed in claim 2 wherein said second material is quartz.

4. A coupler as claimed in claim 3 wherein said first material is carbon tetrachloride ($CCl_4$).

5. A coupler as claimed in claim 4 wherein said temperature control means heats the end of said fiber-optic guide, where the coupling is to take place, to said particular temperature, the indices $n_1$ and $n_2$ being substantially the same, the temperature of said guide gradually decreasing in said limited region of said guide away from said end.

* * * * *